(No Model.)
C. G. COLLINS.
PURIFICATION OF BRINE.
No. 470,181. Patented Mar. 8, 1892.
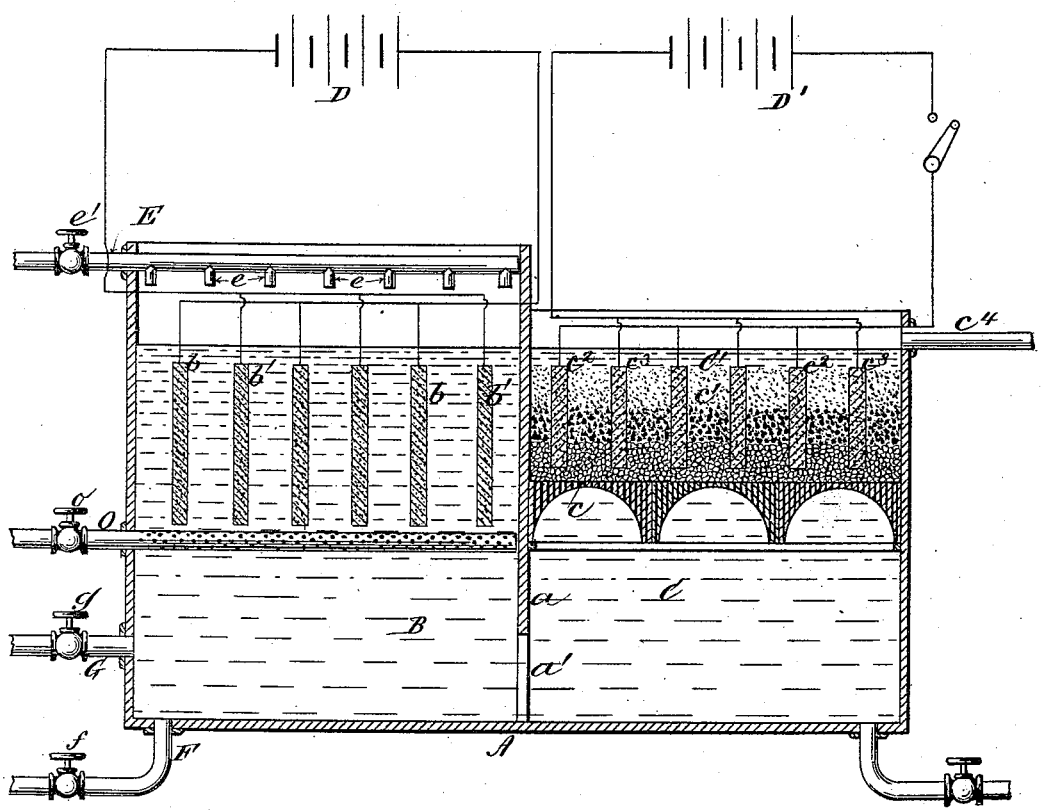

UNITED STATES PATENT OFFICE.

CALEB GROZIER COLLINS, OF KEARNEY, NEW JERSEY, ASSIGNOR TO CALVIN AMORY STEVENS, OF NEW YORK, N. Y.

PURIFICATION OF BRINE.

SPECIFICATION forming part of Letters Patent No. 470,181, dated March 8, 1892.

Application filed May 2, 1891. Serial No. 391,405. (No model.)

*To all whom it may concern:*

Be it known that I, CALEB GROZIER COLLINS, a citizen of the United States, residing at Kearney, in the county of Hudson and State of New Jersey, have invented certain new and useful Improvements in the Purification of Brine, of which the following is a description sufficient to enable others skilled in the art to which the invention appertains to use the same.

My present invention is an improvement upon the process of purifying brine set forth in my application, Serial No. 373,300, filed December 2, 1890, in which the brine is subjected to a current of electricity having an electro-motive force not exceeding two and one-half volts in intensity, or insufficient to decompose the chloride of sodium. The purification of the brine by electrolysis, as above set forth, is due to the decomposition of the impurities by the electric current, thereby rendering them insoluble, and also to the formation of ozone by the decomposition of water, the oxidizing and consequent purifying action of which is well known. As, however, in the case referred to the electric current must first charge the brine with oxygen before any considerable amount of ozone can be produced, since the formation of the ozone is dependent upon the presence of free oxygen in the brine, upon which the nascent oxygen liberated by the electric current reacts to convert it into ozone, it is obvious that the process is comparatively slow in so far as the purification depends upon the ozone present.

My present invention consists in the introduction of an independent supply of oxygen into the brine, in conjunction with the use of an electric current of an electro-motive force not exceeding two and one-half volts in intensity, so that the nascent oxygen generated in the brine by the current will combine immediately with the dissolved oxygen, producing thereby a maximum amount of ozone under conditions most favorable for the purification of the brine without decomposing the chloride of sodium.

My invention also includes, incidentally, the continuous process of purifying brine by treating it simultaneously with free oxygen and an electric current having an electro-motive force not exceeding two and one-half volts in intensity and removing the precipitates thus formed by mechanical means.

In my concurrent application for patent for the purification of liquids, executed and bearing even date herewith, I set forth the use of free oxygen in conjunction with the electric current in the purification of liquids generally, and confine myself in this application exclusively to the special process of purifying brine hereinafter claimed.

In the accompanying drawing I illustrate symbolically apparatus suitable for carrying out my improved process of purifying brine, although I do not confine myself to the use of any special construction and arrangement of parts, since it is obvious that the apparatus may be varied or modified materially and still be adapted to meet the practical and essential requirements of my invention.

The drawing shows a tank A, divided into two compartments B and C by the vertical partition $a$. In the first compartment B are arranged a series of anodes $b$ and cathodes $b'$, connected with the respective poles of a battery D or other suitable source of electricity, care being taken to limit the current to an intensity not exceeding two and one-half volts, so as to protect the chloride of sodium from decomposition. The electrodes $b\ b'$ are of carbon, platinum, or other material not prejudicially acted upon by oxygen or by the impurities contained in the brine to be treated. A supply-pipe E is arranged above the electrodes $b\ b'$, and is preferably formed with a series of discharge-openings $e$, arranged to distribute the supply of brine uniformly to the tank. A valve $e'$ controls the supply of brine. Any suitable number of these supply-pipes E may be employed in effecting the desired result, according to the requirements and capacity of the apparatus used. Below the electrodes $b\ b'$ is situated an oxygen-distributing pipe O, perforated or otherwise formed to permit of the introduction of the oxygen gas into the surrounding brine. The oxygen-pipe O, provided with a valve $o$, is connected with a reservoir of compressed oxygen, or with any other suitable or convenient source of supply. The oxygen escaping from the pipe O combines with the nascent oxygen from the electrodes to form ozone, which acts upon impurities held in solution or in suspension in the brine, precipitating or destroying them. The bottom of the tank B is provided with a discharge-pipe F, through which solid precipitates settling to the bottom may be removed, and with a brine-discharge pipe G, arranged at a suitable level, through which the brine clarified by the combined action of the electric current and the ozone may be withdrawn. Both the discharge-pipes F and G are provided with valves $f$ and $g$, respectively.

There is an opening $a'$ in the partition $a$ of the tank A, which opening establishes communication between the two compartments B and C. In the compartment C, above the opening $a'$, is situated a horizontal partition or floor $c$, formed with a series of perforations through which the brine is enabled to rise upward into the filtering-chamber $C'$, provided with a suitable filtering medium $c'$, preferably having embedded in it a series of electrodes $c^2 c^3$, connected alternately with the positive and negative poles of the battery $D'$ or other suitable source of electricity in such manner that the current may be thrown on or off the filtering material at pleasure. The current of electricity is so regulated as not to exceed two and one-half volts in intensity under any circumstances, so as to protect the chloride of sodium from decomposition.

The filtering-chamber $C'$ is provided with an outlet or overflow pipe $c^4$, which is above the filtering medium, but on a lower level than that of the supply-pipe E, so that the purified brine will flow off naturally by hydrostatic pressure.

In operation the brine to be treated is introduced into the tank B by the supply pipe or pipes E. In descending through the said compartment B it is impregnated with ozone evolved by the combination of the nascent oxygen generated between the electrodes by an electric current of not more than two and one-half volts with the oxygen introduced by the supply-pipe O. Most of the impurities are rendered insoluble and precipitated or are destroyed by the combined action of the electric current and the ozone. The insoluble precipitates may be allowed to settle to the bottom of the compartment B, to be eventually removed through the discharge-pipe F or by other means, while the purified brine may be conducted off by the discharge-pipe G; or the impurities may be positively separated and eliminated from the brine by causing the latter to flow through the filtering material $c'$ in the second compartment C, preparatory to its discharge for evaporation and crystallization. When the brine is of such a character that the impurities after decomposition and precipitation in the compartment B are liable to recombine to form soluble compounds when beyond the combined influence of the electrical current, I connect the anodes and cathodes in the filtering material $c'$ alternately with the poles of a battery $D'$ or other sources of electricity, care being taken to duly regulate and maintain the current at an intensity below two and one-half volts, in which case the soluble compounds, if re-formed as above stated, are again decomposed by the electrical current into insoluble products, which are positively removed by the filtering material and retained thereby, as set forth in my application, Serial No. 373,300, hereinbefore referred to.

What I claim as my invention, and desire to secure by Letters Patent, is—

1. The process of purifying brine herein set forth, consisting in introducing an independent supply of oxygen into the brine and subjecting the brine to a current of electricity having an electro-motive force not exceeding two and one-half volts in intensity, whereby nascent oxygen is liberated and combines with the oxygen independently introduced into the brine to form ozone without decomposing the chloride of sodium, substantially in the manner described.

2. The process of purifying brine herein set forth, consisting in introducing an independent supply of oxygen into the brine, subjecting the brine to a current of electricity having an electro-motive force not exceeding two and one-half volts in intensity, whereby nascent oxygen is liberated and combines with the oxygen independently introduced into the brine to form ozone without decomposing the chloride of sodium, and then separating the resulting precipitates from the brine by passing it through a filtering medium, substantially in the manner and for the purpose described.

3. The process of purifying brine herein set forth, consisting in introducing an independent supply of oxygen into the brine, subjecting the brine to a current of electricity having an electro-motive force not exceeding two and one-half volts in intensity, whereby nascent oxygen is liberated and combines with the oxygen independently introduced into the brine to form ozone without decomposing the chloride of sodium, and then separating the precipitates from the brine by passing it through a filtering medium under the influence of an electric current not exceeding two and one-half volts, substantially in the manner and for the purpose described.

CALEB GROZIER COLLINS.

Witnesses:
GEORGE WILLIAM MIATT,
D. W. GARDNER.